United States Patent [19]

Kanatani

[11] Patent Number: 4,563,062
[45] Date of Patent: Jan. 7, 1986

[54] MICROSCOPE OPTICAL SYSTEM AND METHOD FOR MICROSCOPIC EXAMINATION

[75] Inventor: Fujio Kanatani, Yokosuka, Japan
[73] Assignee: Nippon Kogaku K.K., Tokyo, Japan
[21] Appl. No.: 641,402
[22] Filed: Aug. 14, 1984

Related U.S. Application Data

[63] Continuation of Ser. No. 370,479, Apr. 21, 1982, abandoned.

[30] Foreign Application Priority Data

Apr. 25, 1981 [JP] Japan .................................. 56-61910

[51] Int. Cl.$^4$ .............................................. G02B 7/02
[52] U.S. Cl. .................................................. 350/520
[58] Field of Search ............................... 350/520, 422

[56] References Cited

U.S. PATENT DOCUMENTS 2,237,943  4/1941  Lihotzky ............................. 350/520
3,481,665  12/1969  Rosenberger ....................... 350/422
3,493,290  2/1970  Traub .................................. 350/174
3,709,579  1/1973  Makosch ............................. 350/520
4,208,099  6/1980  Tojyo .

FOREIGN PATENT DOCUMENTS 2729024  11/1978  Fed. Rep. of Germany ...... 350/520

Primary Examiner—John K. Corbin
Assistant Examiner—Vincent J. Lemmo
Attorney, Agent, or Firm—Fitzpatrick, Cella, Harper & Scinto

[57] ABSTRACT

A microscope optical system for observation of test object, comprises an objective lens and a compensator provided to be inserted into and retracted from the optical path of the objective lens. The compensator is inserted into the optical path according to the change of the optical path length of the medium between the object lens and object to maintain good image forming performance irrespective of such change of the optical path length.

14 Claims, 18 Drawing Figures

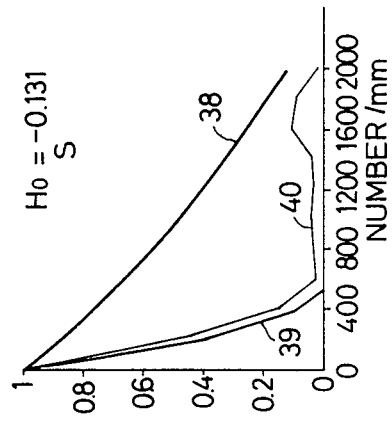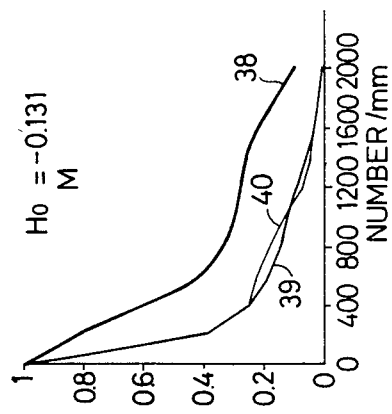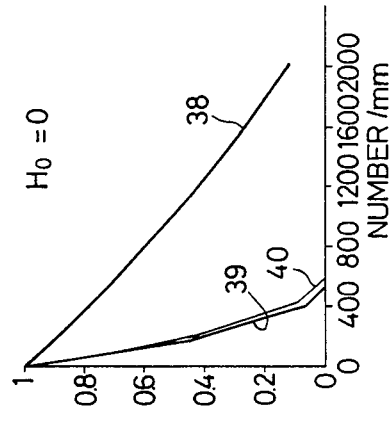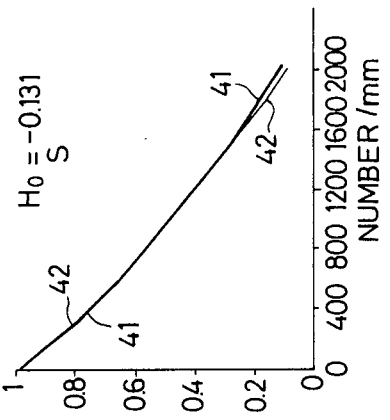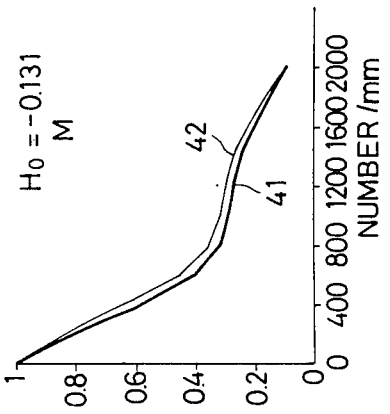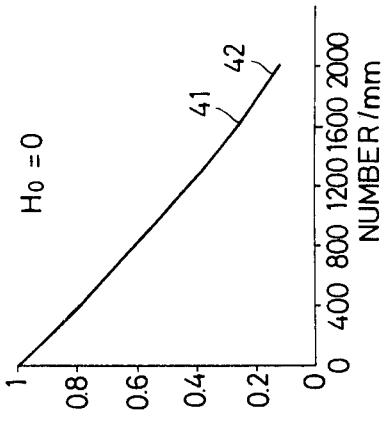

MICROSCOPE OPTICAL SYSTEM AND METHOD FOR MICROSCOPIC EXAMINATION

This application is a continuation of application Ser. No. 370,479 filed Apr. 21, 1982, now abandoned.

BACKGROUND OF THE INVENTION

1. Field of the Invention

The present invention relates to a microscope optical system. More particularly, the present invention relates to an optical system which is able to compensate any unfavourable change of aberration as caused by the change of medium in the object space of an objective lens, especially a large aperture objective lens, for a microscope.

2. Description of Prior Art

An emulsion chamber is one of the known apparatus for recording the track of cosmic rays. The recording apparatus called emulsion chamber has a structure composed of alternating layers of lead plate and nuclear dry plate. The thickness of the lead plate is about 1 mm. FIG. 1 schematically shows the structure of a nuclear dry plate E as used in the emulsion chamber. As shown in FIG. 1, the nuclear dry plate is composed of a base 1 and two emulsion layers 2a and 2b between which the base 1 is sandwiched. As the base 1 there is commonly used methacrylic plate or polystrene plate. Examples of the combination of base plate and emulsion layers with respect to thickness are as follows:

(i) 0.08 mm thick emulsion layer + 1 mm thick methacrylic plate + 0.08 mm thick emulsion layer (ii) 0.3 mm thick emulsion layer + 0.15 mm thick polystyrene plate + 0.3 mm thick emulsion layer The track of cosmic ray is recorded on the emulsion layers of the nuclear dry plate. When the recorded track is examined through a microscope for three-dimensional coordinate measurement, it is necessary to observe not only the emulsion layer on the upper side of the base 1 as viewed from the microscope but also the underside emulsion layer through the base 1.

When the lens is then used in an oil immersion system of microscope objective lens in which the object space is filled with oil, the mediums existing in the object space such as oil, emulsion layer, base etc. have different refractive indexes and different values of dispersion. Therefore, the condition of aberration for microscopic observation of the nuclear dry plate at different depths is not constant but variable according to the change of depth ratio among the mediums, namely oil, emulsion layers and base in the object space. This change of aberration becomes unduly great in particular for a large numerical aperture (N.A.) objective lens. In the worst case, the microscopic observation becomes impossible. This will be further described with reference to MTF (Modulation Transfer Function) curves shown in FIG. 2.

By way of example, description is made in connection with an oil immersion type objective lens of focal length f=8.9 mm, magnification=50 X and N.A.=0.85.

Curve 3 in FIGS. 2A, B and C is an MTF curve obtained when the object space of the objective lens is filled with oil only. Curves 4 and 5 are MTF curves obtained when a part of the object space was replaced by the above described nuclear dry plate and the microscope was so set as to observe the further-most object point from the objective lens. The curve 4 is for the above shown combination (i) and the curve 5 for the combination (ii). FIG. 2A shows MTF at the center of the visual field (Ho=0). FIGS. 2B and C show MTF at a point spaced from the visual field center (Ho=−0.142) in meridional direction and sagital direction respectively (this description of MTF curves is applied also to the following drawings). In the shown example, the wavelength used is λ=546.1 nm (e-ray). To this wavelength the mediums exhibit the following refractive indexes:

| | |
| --- | --- |
| Oil | $n_e = 1.51969$ |
| Emulsion layer | $n_e = 1.53500$ |
| Methacylic plate | $n_e = 1.49340$ |
| Polystyrene plate | $n_e = 1.59765$ |

By inserting the nuclear dry plate, the MTF curve is shifted from 3 to 4 or 5. This unfavourable change of MTF is caused by the difference in refractive index between oil and nuclear dry plate.

Originally the object lens has been aberration compensated under the condition of the object space filled with oil. But, a part of the medium in the object space of the objective lens is replaced by another medium, combination (i) or combination (ii). The medium composed of the combination (i) has a lower refractive index than the original medium (oil) has. The medium composed of the combination (ii) has a higher refractive index than the original medium. Therefore, the state of aberration changes unfavourably in the direction toward undercompensated spherical aberration or in the direction toward overcompensated spherical aberration, whereby MTP is degraded as shown in FIG. 2.

Such unfavourable change of aberration may be compensated by changing the air gap within the objective lens as in the case of an objective lens for tissue culture microscope. Also, it may be compensated by moving any lens element of the objective lens. In either case, however, the focal length of the objective lens itself is changed by it and therefore the magnification thereof also changes. To carry out the coordinate measurement employing ITV camera (industrial television camera) or the like, therefore, it is required to continuously make a necessary adjustment every moment to cope with the magnification change. This correction is very complicated and is practically unrealizable. In addition, such compensating method by changing the air gap in the objective lens or by shifting any element of the lens necessarily involves the problem of eccentricity. Even when the position of the objective lens is completely adjusted to the height necessary for observation within the plane of the emulsion layer by moving the lens up and down precisely, the reference coordinate for microscopic examination will be lost due to the eccentric change.

SUMMARY OF THE INVENTION

Accordingly it is the general object of the present invention to overcome the problem mentioned above.

A more specific object of the invention is to provide a microscope optical system which is able to compensate aberration whenever there occurs any change in medium.

To attain the objects according to the present invention, there is provided a microscope optical system comprising an objective lens and a meniscus lens moveably disposed for insertion into and retraction from the optical path on the image space side of the objective lens. The meniscus lens has its concave surface directed toward the objective lens or having its convex surface directed toward the objective lens. The meniscus lens is inserted in the optical path or retracted from it according to the change of optical path length of the medium between the objective lens and the test object plane thereby compensating the degradation of image forming performance caused by the change of the medium. More particularly, when the optical path length n×d (n: refractive index of medium and d: thickness) is made shorter than the reference value, the meniscus lens with its convex surface facing the objective lens is inserted into the optical path. When the optical path length is made longer than the reference value, the other meniscus lens with its concave surface facing the objective lens is inserted into the optical path.

Other and further objects, features and advantages of the invention will appear more fully from the following description of preferred embodiments taken in connection with the accompanying drawings.

BRIEF DESCRIPTION OF THE DRAWINGS

FIGS. 2A–2C show MTF curves obtained without compensation lens in which FIG. 2A shows MTF curves at the center of visual field, FIG. 2B shows MTF curves at a spaced point from the visual field center in meridional direction M and FIG. 2C shows MTF curves at a point spaced from the visual field center in sagital direction S;

FIGS. 7A–7C show MTF curves obtained from the second embodiment but without compensation lens; and FIGS. 8A–8C show MTF curves obtained from the second embodiment with the compensation lens 36 or 37 being inserted.

DESCRIPTION OF PREFERRED EMBODIMENTS

Figure 3:
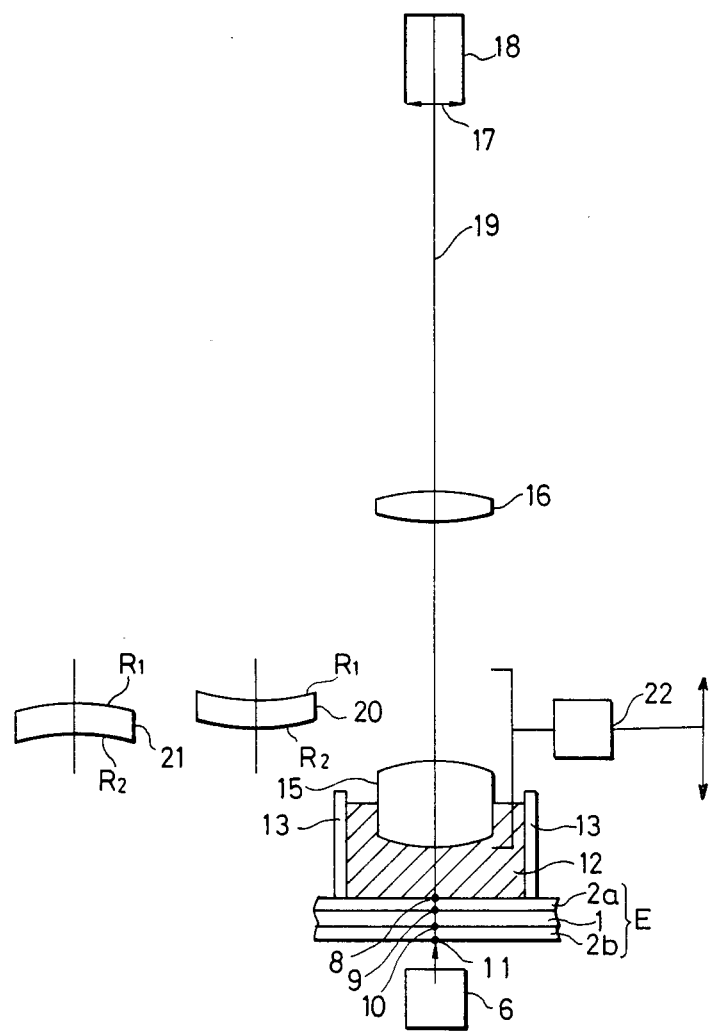
FIG. 3 is a schematic sectional view of a first embodiment of the invention.

FIG. 3 shows an embodiment in which the present invention is embodied in a microscope for observation of a nuclear dry plate as mentioned above.

The illumination unit 6 is of the type known as Köhler illumination for illuminating uniformly all of the visual field. As previously described, the nuclear dry plate E is composed of a base layer 1 and two emulsion layers 2a and 2b. The track of ray such as cosmic ray is recorded as a line of dots in the emulsion layers 2a and 2b. A container 13 is placed on the nuclear dry plate. The container 13 is almost fully filled with oil 12 in a sufficient amount to prevent so-called oil-out state caused by the up-and-down movement of the lens 15. Oil-out state, that is, a shortage of the oil in the container produces air invasion by which the image is disturbed.

The first and second objective lenses 15 and 16 together constitute an objective lens system of this optical apparatus. The objective lens system is designed as an infinity system, that is a, the optical path between the first and second objective lens groups 15 and 16 is parallel ray system. The image surface 17 of the image pick-up tube 18 lies on the image side focal plane of the second objective lens 16. An image of the object is formed on the surface 17. Therefore, with the arrangement of the optical system, the position of the image surface 17 remains unchanged even when the first objective lens 15 is moved up and down during examination. There occurs no change of magnification either.

The optical axis 19 of the objective lens system is set perpendicularly to the dry plate E. With the up-and-down movement of the first objective lens 15, a series of object points (black dots) 8, 9, 10, 11 and so on within the nuclear dry plate become observable sequentially on the ITV camera. Provided between the first and second objective lenses 15 and 16 are meniscus lenses 20 and 21 serving as compensation lens to be selectively inserted into the optical path on the optical axis 19. These compensation lenses 20 and 21 constitute the essential part of the present invention. In accordance with necessity, either of the meniscus lenses 20 and 21 is brought to its working position on the optical axis 19. As the focal length of these compensation lenses is very long, the magnification of an image formed on the image plane 17 can not be changed by insertion of the compensation lens 20 or 21. The compensation lens 20 or 21 can be moved together with the first objective lens 15 in the direction along the optical axis 19 by a vertical driving unit 22. The driving unit 22 is so formed as to have a high degree of correctness by means of, for example, parallel leaf springs not shown. The correctness attainable is in the order of 0.1 μm to the moving range of 0.3 mm. For three-dimensional coordinate measurement of the track recorded in the nuclear dry plate by the combination of two-dimensional coordinate measurement through the ITV camera and the vertical movement of the objective lens, extremely high precision is required because the size of the recorded black dot is generally of the order of 1 μm. The correctness of the order of 0.1 μm for the up-and-down movement range of 0.3 mm is sufficient to satisfy the requirement of such high precision. When the emulsion layer 2a of the dry plate E on the side near the first objective lens 15 is to be observed, neither compensation lens 20 nor 21 is moved to its working position on the optical axis 19. Both of the compensation lenses 20 and 21 remain in their retracted positions. The compensation lens 20 or 21 is inserted into the optical path only when the emulsion layer 2b on the opposite side is to be observed through the base layer 1. The manner of insertion of the compensation lens will be described in detail hereinafter.

Case I

The refractive index of the base layer is lower than that of oil (the case of above combination (i)):

In this case, the meniscus lens 20 whose convex surface is directed toward the object space side of the objective lens 15 is inserted in the optical path on the image space side of the lens 15.

For example, let the first objective lens be of focal length f=8.9 and F-number=0.586 (N.A.=0.85) and data of the compensation lens 20 be:

$R_1 = 60.5$    $t = 4.5$    $n = 1.5187$

-continued $$R_2 = 61.663$$

wherein, $R_1$ is radius of curvature of the surface on the image space side;

$R_2$ is radius of curvature of the surface on the object space side;

t is thickness; and n is refractive index wherein the surface convex toward the object space side is positive.

Figure 4A:
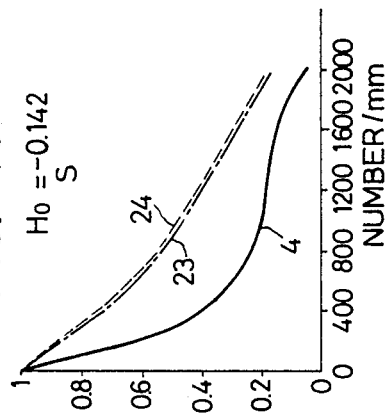
FIGS. 4A–4C show MTF curves obtained from the arrangement of the first embodiment with the compensation lens 20 being inserted.
Figure 4B:
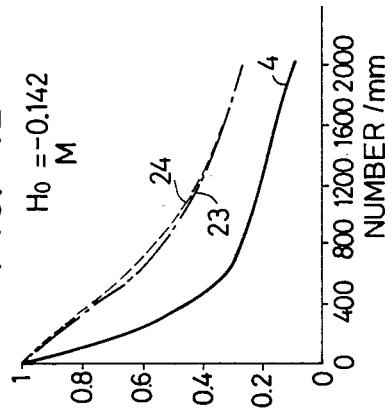
Figure 4C:
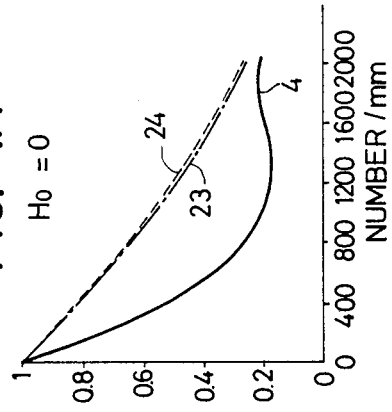

Then, MTF curve 4 without compensation lens shown in FIG. 2 is improved to the curve 24 shown in FIG. 4 by insertion of the compensation lens 20. The curves 4 and 24 relate to the image of object point 11 at the farther-most distance from the objective lens in the emulsion layer 2b. Curve 23 is MTF curve relating to the object plane containing the object point 10 lying in the boundary between the base layer 1 and the emulsion layer 2b.

Comparing curves 23 and 24 with curve 3 in FIG. 2, it will be understood that by insertion of the compensation lens 20 the value of MTF could be improved to a great extent and the improved MTF is substantially equivalent to the value of MTF as obtained when the nearest emulsion layer 2a was observed without compensation lens.

Case II

The refractive index of the base layer 1 is higher than that of oil (the case of above combination (ii)):

In this case, the meniscus lens 21 whose concave surface is directed toward the object space side of the first objective lens 15 is inserted in the optical path on the image space side of the lens 15 (this meniscus lens 21 may be provided by inverting the concave meniscus lens 20).

Figure 5A:
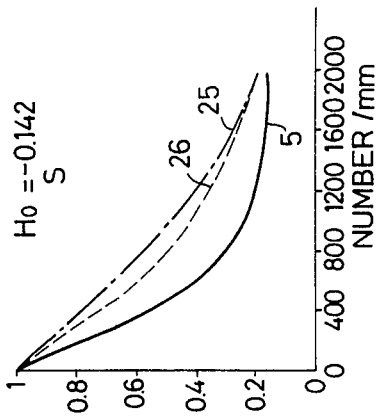
FIGS. 5A–5C show MTF curves also obtained from the first embodiment with the compensation lens 21 being inserted.
Figure 5B:
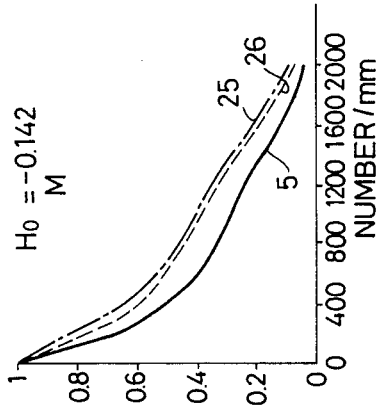
Figure 5C:
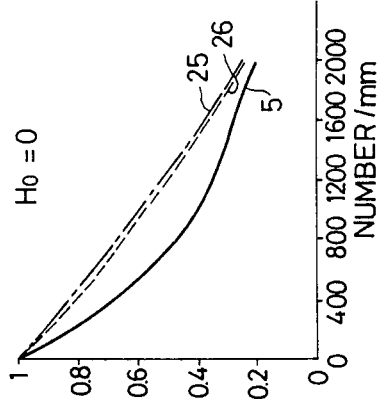

When the compensation lens 21 is so designed as to have the following lens data, provided that data of the first objective lens are all the same as in Case (I), MTF curve 5 without compensation lens shown in FIG. 2 is improved to curve 26 shown in FIG. 5 by the insertion of the compensation lens 21.

$$\left[\begin{array}{l} R_1 = -132.5 \\ R_2 = -139.953 \end{array}\right. \quad t = 4.5 \quad n = 1.51871$$

wherein $R_1$, $R_2$, t and n have the same meaning as above and again the surface convex toward the object space side is positive.

Curves 5 and 26 are MTF curves relating to the image of the object point 11 at the farther-most distance from the objective lens in the emulsion layer 2b. Curve 25 is MTF curve relating to the object plane including the object point 10 lying in the interface between the base layer 1 and the emulsion layer 2b.

Figure 1:
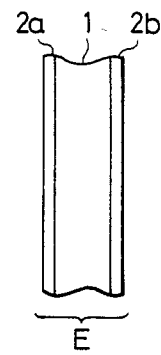
FIG. 1 is a schematic cross-sectional view of a known nuclear dry plate.
Figure 2A:
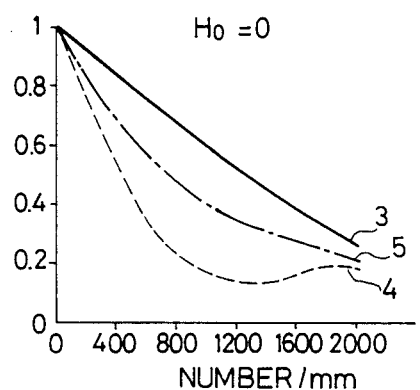
Figure 2B:
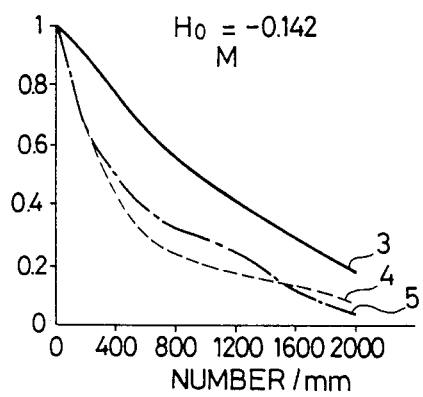
Figure 2C:
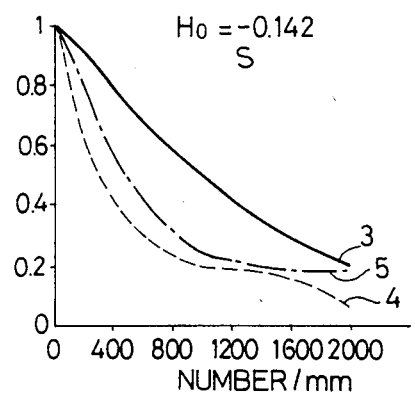

Comparing the curves 25 and 26 with curve 3 shown in FIGS. 2a, 2b or 2c, it will be understood that MTF attained by the insertion of the compensation lens 21 is substantially equivalent to MTF of the curve 3 as for the values of MTF at the visual field center (Ho=0) and in sagital direction S at the distance of Ho= −0.142 mm from the center, while a little degradation remains uncompensated only in meridional direction M at that distance from the center. This demonstrates the effect of the invention to greatly improve MTF by use of the compensation lens.

In the above embodiment, the compensation lenses 20 and 21 have been shown to be movable together with the first objective lens 15 along the optical axis by the vertical driver 22. However, if the range of this vertical movement is of the order of 1.2 mm as in the case of above combination (i) or (ii), the compensation lenses 20 and 21 may be fixed while supporting only the first lens 15 movable. Since the compensation lenses 20 and 21 have almost no power, they scarcely cause any degradation of aberration. Further, since the embodiment is so designed as to provide a parallel ray system between the first and second objective lenses 15 and 16, the movement of the objective lens 15 does not produce any change in position and magnification of the image. The position and magnification of the image remain unchanged even when the compensation lens 20 or 21 is inserted in the optical path because the power of the compensation lens is substantially zero. Therefore, ITV image pick-up tube 18 can be set stationary in the practical arrangement of this system. This brings about a great merit that the apparatus can be simplified as a whole.

Figure 6:
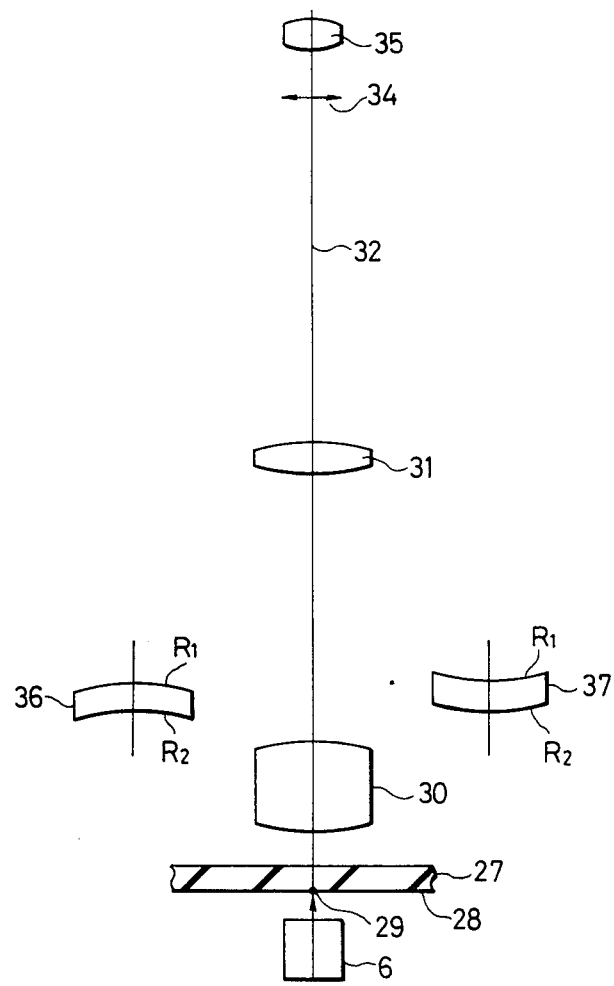
FIG. 6 is a schematic sectional view of a second embodiment of the invention.

FIG. 6 shows a second embodiment of the invention.

Again, 6 designates a known transmission illumination unit. 27 is a plane parallel glass plate which may be mask glass or reticle glass used in making IC or LSI. The thickness of the glass plate 27 is typically 0.06 inch or 0.09 inch. 28 is the pattern surface of the mask or reticle 27. Generally, the glass plate 27 is positioned with its pattern surface 28 on the opposite side to the objective lens 30. Like the objective lens 15 in the first embodiment, the objective lens 30 in this embodiment is designed as an infinity system, namely, as a parallel ray system. An image of the pattern surface 28 is formed on the rear focal plane 34 of the second objective lens 31. The examiner can observe the formed image on the focal plane 34 through an ocular 35 with a desired magnification. The optical axis 32 is common to the first and second objective lenses 30 and 31.

FIG. 7 shows MTF curves of which the curve 38 is that obtained with the above arrangement under the following conditions:

The focal length of the first objective lens 30: f=15 mm, its numerical aperture N.A.=0.7, the thickness of the plane parallel glass 27 is 4 mm and the wavelength used is e-ray (λ=546.1 nm). If the thickness of the plane parallel glass 27 is increased by 0.1 mm, then MTF curve of the system changes from curve 38 to curve 39 in FIG. 7. If the thickness is decreased by 0.1 mm, then MTF curve changes from 38 to 40 in FIG. 7. Comparing the curves 39 and 40 with curve 38 it will be readily understood that for a large aperture lens such as N.A.=0.7, the quality of formed image is degraded to such extent as to be unusable by only 0.1 mm change from the design value of the thickness of the plane parallel glass in the object space of the lens. Allowance of thickness of such plane parallel glass plate useful for mask and reticle is usually ±0.1 mm. Therefore, to observe the pattern on the opposite side through the glass, the degraded MTF by the change of the glass thickness should be compensated by some means.

To solve the problem, also in this second embodiment there are used meniscus lenses 36 and 37 similar to the meniscus lenses 20 and 21 in the first embodiment.

In FIG. 6, the first compensation lens 36 is a meniscus lens whose concave surface is directed toward the first objective lens 30. The second compensation lens 37 is a meniscus lens whose convex surface is directed toward the objective lens 30. When the thickness of the plane parallel glass 27 is increased by 0.1 mm, the first compensation lens 36 is inserted into the optical path on the image space side of the objective lens 30. On the contrary, when the thickness is decreased by 0.1 mm, the second compensation lens 37 is inserted into the optical path in the same manner. Lens data of the first and second meniscus lenses are as follows ($R_1$, $R_2$, t and n have the same meaning as defined above and the surface convex toward the image space side is positive):

Meniscus lens 36:
$\begin{bmatrix} R_1 = 241.0 \\ R_2 = 217.13 \end{bmatrix}$  t = 8   n = 1.51871

Meniscus lens 37:
$\begin{bmatrix} R_1 = -240.0 \\ R_2 = -221.197 \end{bmatrix}$  t = 8   n = 1.51871

Curve 41 in FIG. 8 is MTF curve obtained when the meniscus lens 36 is inserted into the optical path as described above. Curve 42 is MTF curve obtained when the second meniscus lens 37 is inserted. Comparing the curves 41 and 42 in FIG. 8 with the curve 38 in FIG. 7, it is readily understood that the degradation of MTF caused by ±0.1 mm change in thickness of the glass 27 could be compensated very well by the insertion of the meniscus lens 36 or 37 so that there was substantially no degradation of image. As to the radius of curvature of the compensation meniscus lenses it has been also found desirable to design the meniscus lenses in such manner as to satisfy the following condition:

$$0.8 < \frac{R_1}{R_2} < 1.2$$

As readily understood from the foregoing, the optical system of the invention has many advantages over the prior art ones. According to the invention, spherical aberration can be compensated almost completely when there occurred any change of the optical path length of the medium between an objective lens and a test object. It enables maintenance of good resolving power even for a large aperture objective lens. In the optical system of the invention there occurs substantially no change of image magnification. In addition, the number of moving elements in the optical system is very small. Therefore, there is little degradation of performance caused by eccentricity in the optical system.

While the above embodiments have been shown and described to include two objective lenses, first and second objective lenses with a parallel ray system therebetween, it is to be understood that the present invention is also applicable to such a microscope having a first objective lens only. For such apparatus also, the compensation meniscus lens is inserted into the optical path on the image space side of the objective lens in the same manner as in the above embodiments. The effect obtainable by it is substantially equivalent to the effect attained by the above embodiments although the image position may be slightly changed in this case. The parallel ray system between the first and second objective lenses as shown in the above embodiments serves to keep the image position constant. However, it is to be understood that for the optical system having a first objective lens only, very good maintainence of the image-forming performance can be attained according to the invention.

I claim:

1. A microscope optical system for observation of two surfaces of an object maintaining both image position and image magnification constant, one of two object surfaces being positioned at a predetermined optical path length position from an objective lens and the other object surface being positioned at a different optical path length position from the objective lens, said optical system comprising:

a first objective lens for converting light rays from one of the object surfaces into parallel light rays, said first objective lens being movable along the optical axis thereof;

a second objective lens for converging the parallel light rays from the first objective lens;

means for moving the first objective lens along the optical axis with respect to said second objective lens so as to convert light rays from the other surface of the object into parallel light rays and then to attain focusing on said other object surface of the object; and meniscus lens means having weak optical power insertable between said first objective lens and said second objective lens, said meniscus lens means including a meniscus lens having its concave surface directed toward the object side and having compensation function for spherical aberration resulting from the increase in the optical path length between said other surface of the object and said first objective lens as compared with the predetermined reference optical path length, said meniscus lens being disposed between said first objective lens and said second objective lens only when the optical path length between said other object surface of the object and said first objective lens is larger than the predetermined reference optical path length.

2. A microscope optical system according to claim 1 wherein said meniscus lens means further includes another meniscus lens having its convex surface directed toward the object side and having compensation function for spherical aberration resulting from the decrease in the optical path length between said surface of the object and said first objective lens as compared with the predetermined reference optical path length, said another meniscus lens being disposed between said first objective lens only and said second objective lens when the optical path length between said other object surface of the object and said first objective lens is smaller than the predetermined reference optical path length.

3. A microscope optical system according to claim 2, wherein the one of the object surface of the object is an objective lens side surface of the object and the other object surface of the object is the rear side surface of the objective lens side surface of the object.

4. A microscope optical system according to claim 3, wherein said moving means is able to move said meniscus lens means inserted between said first objective lens and said second objective lens together with said first objective lens.

5. A method for microscopic observation of at least two planes of an object by a microscope optical system having a first objective lens for converting light rays from the object into parallel light rays and a second objective lens for converging the parallel light rays from the first objective lens, said method comprising the steps of:

setting the first objective lens so as to convert the light rays from a first observation plane of said object;

observing the image of said first observation plane formed by said second objective lens;

moving said objective lens along the optical axis thereof with respect to said second objective lens;

setting the first objective lens so as to convert the light rays from the second observation plane different to said first observation plane of the object;

discriminating whether an optical path length between said second observation plane and said first objective lens is larger or smaller than a predetermined reference optical path length;

selecting a meniscus lens having its concave surface directed toward the object side only when the optical path length between the second observation plane and the first objective lens is larger than the predetermined reference optical path length and selecting a meniscus lens having its convex surface directed toward the object side only when the optical path length between the second observation plane and the first objective lens is smaller than the predetermined reference optical path length said meniscus lens concave toward the object side having compensation function for spherical aberration resulting from the increase in the optical path length between said second observation plane and said first objective lens as compared with said predetermined reference optical path length, said meniscus lens convex toward the object side having compensation function for spherical aberration resulting from the decrease in the optical path length between said second observation plane and said first objective lens as compared with said predetermined reference optical path length;

inserting the meniscus lens selected by said selecting step between the first objective lens and the second objective lens; and observing the image of said second observation plane formed by said second objective lens.

6. A method for microscopic observation according to claim 5, wherein said first observation plane is an objective lens side surface of the object and said second observation plane is a rear side surface of the objective lens side surface of the object.

7. A method for microscopic observation according to claim 6, wherein said moving step is the step of moving said meniscus lens means along the optical axis thereof together with said first objective lens.

8. In a microscope optical system for observing an object surface disposed at a predetermined optical path length position from an objective lens and for observing another object surface positioned at a longer optical path length position from said objective lens than said predetermined optical path length position, while maintaining both image position and image magnification constant, the improvement which comprises:

a first objective lens as said objective lens for converting light rays from one of the object surfaces into parallel light rays, said first objective lens being movable along the optical axis thereof;

a second objective lens for converting the parallel light rays from the first objective lens;

means for moving the first objective lens along the optical axis with respect to said second objective lens so as to convert light rays from said another object surface of the object into parallel light rays and then to attain focusing on said another object surface of the object; and a meniscus lens element having substantially no optical refractive power insertable between said first objective lens and said second objective lens during observation of said another object surface, said meniscus lens element being a meniscus lens concave toward the object side for compensating spherical aberration resulting from the increase in the optical path length between said another object surface and said first objective lens as compared with the predetermined reference optical path length.

9. A microscope optical system according to claim 8, wherein said meniscus lens satisfies the condition:

$$0.8 < R_1/R_2 < 1.2$$

wherein, $R_1$ is the radius of curvature of the image side surface of the meniscus lens and $R_2$ is the radius of curvature of the object side surface of the same.

10. In a microscope optical system for observing an object surface disposed at a predetermined optical path length position from an objective lens and for observing another object surface positioned at a shorter optical path length position from said objective lens than said predetermined optical path length position, while maintaining both image position and image magnification constant, the improvement comprises:

a first objective lens as said objective lens for converting light rays from one of the object surfaces into parallel light rays, said first objective lens being movable along the optical axis thereof;

a second objective lens for converging the parallel light rays from the first objective lens;

means for moving the first objective lens along the optical axis with respect to said second objective lens so as to convert light rays from said another object surface of the object into parallel light rays and then to attain focusing on said another object surface of the object; and a meniscus lens element having substantially no optical refractive power insertable between said first objective lens and said second objective lens during observation of said another object surface, said meniscus lens element being a meniscus lens convex toward the object side for compensating spherical aberration resulting from the decrease in the optical path length between said another object surface and said first objective lens as compared with the predetermined reference optical path length.

11. A microscope optical system according to claim 10, wherein said meniscus lens satisfies the condition:

$$0.8 < R_1/R_2 < 1.2$$

wherein, $R_1$ is the radius of curvature of the image side surface of the meniscus lens and $R_2$ is the radius of curvature of the object side surface of the same.

12. In a microscope optical system for observing an upper object surface and a lower object surface of an object formed of predetermined medium while maintaining both image position and image magnification constant, the improvement which comprises:

a first objective lens for converting light rays from one of said object surfaces into parallel light rays, said first objective lens being movable along the optical axis thereof;

a second objective lens for converging the parallel light rays from the first objective lens;

means for moving the first objective lens along the optical axis with respect to said second objective lens so as to convert light rays from the other object surface of the object into parallel light rays and then to attain focusing on said the other object surface of the object; and compensating lens means having a meniscus lens insertable between said first objective lens and said second objective lens, said meniscus lens being disposed between said first objective lens and said second objective lens in one of the cases where said first objective lens is focused on said upper object surface of the objective and where said first object lens is focused on said lower object surface of the object, for compensating spherical aberration resulting from existence or nonexistence of said predetermined medium forming said upper and lower surfaces of the object.

13. A microscope optical system according to claim 12, wherein said meniscus lens of said compensating lens means is a meniscus lens concave toward the object side for compensating spherical aberration resulting from existence of said predetermined medium, said meniscus being disposed between said first objective lens and said second objective lens when said first objective lens is focused on said lower object surface of the object.

14. A microscope optical system according to claim 12, wherein said meniscus lens of said compensating lens means is a meniscus lens for compensating spherical aberration resulting from nonexistence of said predetermined medium, said meniscus lens being disposed between said first objective lens and said second objective lens when said first objective lens is focused on said upper object surface of the object.

* * * * *

UNITED STATES PATENT AND TRADEMARK OFFICE
CERTIFICATE OF CORRECTION

PATENT NO. : 4,563,062
DATED : January 7, 1986
INVENTOR(S) : FUJIO KANATANI

It is certified that error appears in the above-identified patent and that said Letters Patent is hereby corrected as shown below:

IN THE ABSTRACT:

Lines 6-7, "object" should be --objective--.

IN THE SPECIFICATION:

Column 4, line 2, after "is" insert --a--.

IN THE CLAIMS:

Column 8, line 50, delete "only"; same line, after "lens" insert --only-- (Claim 2, line 10).

Column 9, line 64 (Claim 8, line 14), change "converting" to --converging--.

Column 11, line 19 (Claim 12, line 25), change "object" to --objective--.

Signed and Sealed this

Eleventh Day of March 1986

[SEAL]

Attest:

DONALD J. QUIGG

Attesting Officer

Commissioner of Patents and Trademarks